(12) United States Patent
Hewett et al.

(10) Patent No.: US 12,729,744 B2
(45) Date of Patent: Sep. 8, 2026

(54) ISOLATION BUSHINGS WITH CONFORMING MULTI-PART COVERS

(71) Applicant: Rivian IP Holdings, LLC, Irvine, CA (US)

(72) Inventors: Christopher Hewett, Rancho Santa Margarita, CA (US); Christophe Sartiaux, Long Beach, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/346,107

(22) Filed: Jun. 30, 2023

(65) Prior Publication Data

US 2025/0003464 A1 Jan. 2, 2025

(51) Int. Cl.

| | |
|---|---|
| ***F16F 15/08*** | (2006.01) |
| ***B60K 1/00*** | (2006.01) |
| ***F16F 1/36*** | (2006.01) |

(52) U.S. Cl.

CPC ................ *F16F 15/08* (2013.01); *B60K 1/00* (2013.01); *F16F 1/36* (2013.01); *F16F 2224/0208* (2013.01); *F16F 2224/025* (2013.01); *F16F 2230/0005* (2013.01)

(58) Field of Classification Search

CPC ...... F16F 15/08; F16F 1/36; F16F 2224/0208; F16F 2224/025; F16F 2230/0005; B60K 1/00

USPC ........ 248/604, 609, 610, 615; 267/153, 141, 267/292

See application file for complete search history.

(56) References Cited

U.S. PATENT DOCUMENTS 2,263,521 A * 11/1941 Heinrich ................. F16F 1/373 267/282
2,647,717 A * 8/1953 Avery ..................... F16F 1/428 267/141
2,781,990 A * 2/1957 Via ....................... F16F 1/3935 29/523
2,947,969 A * 8/1960 Harris ....................... G01S 1/72 367/173
3,266,761 A * 8/1966 Walton .................. F16L 3/1207 174/164
3,684,223 A * 8/1972 Logsdon ................... F16L 3/12 248/901
4,171,920 A * 10/1979 Kramer ..................... F16F 1/14 267/153
4,778,199 A * 10/1988 Haggerty ............... B60G 7/001 280/124.156
4,854,556 A * 8/1989 Pietrzak .................... F16F 7/14 267/152
5,575,461 A * 11/1996 Ihle ........................... F16F 1/37 267/141

(Continued)

FOREIGN PATENT DOCUMENTS

JP H07280034 A * 10/1995
JP H1082442 A * 3/1998

*Primary Examiner* — Kimberly T Wood
(74) *Attorney, Agent, or Firm* — BAKERHOSTETLER

(57) ABSTRACT

An isolator includes multiple lobes that increase the overall volume of the material used to form the isolator. The isolator may be enclosed by several covers used to constrain the isolator and allow for the additional material provided by the lobes. An assembly of the isolator and the covers may be secured to an object (e.g., a drive unit or subframe) using respective openings in the lobes and the covers.

4 Claims, 10 Drawing Sheets

(56) References Cited

U.S. PATENT DOCUMENTS 6,138,980 A * 10/2000 Farbotnik ............. F16B 5/0258
248/634
6,601,802 B1 * 8/2003 Howe ................... F16L 55/035
248/58
7,611,288 B2 * 11/2009 Lew ....................... B60K 17/24
29/898.07
8,066,266 B2 * 11/2011 Rodecker .............. F16F 1/3732
267/141.1
8,152,146 B2 * 4/2012 Rodecker .................. F16F 1/50
267/141.1
8,186,641 B2 * 5/2012 Valovick ............... F16C 27/066
248/560
8,591,117 B2 * 11/2013 Giraud .................. F16C 27/066
384/535
9,511,664 B2 * 12/2016 Mori ...................... B60K 17/24
9,562,587 B2 * 2/2017 Pichel ................... F16F 1/3863
10,203,060 B2 * 2/2019 Guido ..................... F16L 55/02
10,337,585 B2 * 7/2019 Kojima ................... F16F 15/08
10,519,846 B2 * 12/2019 Kamiya .................... F16B 9/07
10,988,015 B2 * 4/2021 Gutierrez .............. F02F 7/0082
11,561,060 B1 * 1/2023 Kordana ................. F41A 27/08
2003/0111818 A1 * 6/2003 Carlstedt ............... F16F 1/3821
267/276
2004/0207135 A1 * 10/2004 Joseph ............... B60G 21/0551
267/141.1
2005/0242253 A1 * 11/2005 McClure ............... F16L 3/1091
248/230.5
2006/0103100 A1 * 5/2006 Fader ................. B60G 21/0551
267/189
2007/0065062 A1 * 3/2007 Roth ..................... F16C 35/047
384/536
2013/0153741 A1 * 6/2013 Pichel ................... F16F 1/3863
248/634
2013/0256961 A1 * 10/2013 Schlittler .............. F16F 1/3615
267/141
2017/0151853 A1 * 6/2017 Saiki .................. B60G 21/0551
2020/0300326 A1 * 9/2020 Onishi ............. B29C 45/14311
2020/0318703 A1 * 10/2020 Onishi ..................... B60K 5/12
2022/0161654 A1 * 5/2022 Nakagawa ............... A61B 5/18
2022/0316551 A1 * 10/2022 Onishi ................ B60K 5/1208

* cited by examiner

ISOLATION BUSHINGS WITH CONFORMING MULTI-PART COVERS

INTRODUCTION

An isolator, or bushing, is used for isolation of components in a vehicle. For example, a drive unit in a vehicle includes one or more isolator used to isolation one or more components from vibration generated by the drive unit.

SUMMARY

This application is directed to isolators, and more particularly, to isolators covered by clamshell covers. The clamshell covers may constrain the isolator to a general location. Additionally, using the clamshell covers, the volume of the increase may increase to include lobes used as fastening points for the isolator. Beneficially, the increased volume of the bushing may enhanced noise, vibration, and harshness (NVH) performance.

In accordance with one or more aspects of the disclosure, an isolator is described. The isolator may include a first lobe comprising a first opening oriented in a first direction. The isolator may further include a second lobe comprising a second opening. The isolator may further include a body comprising a third opening oriented in a second direction different from the first direction. The first lobe and the second lobe may be integrally formed with the body.

The body, the first lobe, and the second lobe may include a rubber. The second lobe may be oriented in the second direction. The first direction may be perpendicular with respect to the second direction. The first opening and the second opening may be configured to receive a respective fastener to secure the isolator to a drive unit. The third opening may be configured to receive a structure. The isolator may be configured to isolate the structure from vibration caused by the drive unit.

The isolator may further include, a metal ring integrated with the body. The metal ring may encircle the opening. The metal ring may be positioned between the first lobe and the second lobe.

In accordance with one or more aspects of the disclosure, an isolator assembly is described. The isolator assembly may include an isolator. The isolator may include a body. The isolator may further include a first lobe extending from the body. The isolator may further include a second lobe extending from the body. The isolator assembly may further include a first cover. The isolator assembly may further include a second cover. The first cover and the second cover may combine to surround the body, the first lobe, and the second lobe.

The first cover may include a first set of extensions that at least partially covers the first lobe and the second lobe. The second cover may include a second set of extensions that at least partially covers the first lobe and the second lobe. The first lobe may include a first lobe opening. The second lobe may include a second lobe opening. The first set of extensions may include a first opening aligned with the first lobe opening. The first set of extensions may further include a second opening aligned with the second lobe opening. The second set of extensions may include a third opening aligned with the first lobe opening. The second set of extensions may further include a fourth opening aligned with the second lobe opening.

The body further may include a first curved surface. The first cover may include a first curved wall that conforms to the first curved surface. The body may include a second curved surface. The second cover may include a second curved wall that conforms to the first curved surface. The body further may include a planar surface. The first cover further may include a first sidewall that at least partially covers the planar surface. The second cover may further include a second sidewall that at least partially covers the planar surface. Based in part on the first sidewall and the second sidewall, the first cover and the second cover may be configured to constrain the isolator in two degrees.

In accordance with one or more aspects of the disclosure, a vehicle is described. The vehicle may include a drive unit. The vehicle may further include a subframe configured to carry the drive unit. The vehicle may further include an isolator assembly coupled to the subframe. The isolator assembly may include an isolator. The isolator may include a body. The isolator may further include a first lobe extending from the body. The isolator may further include a second lobe extending from the body. The isolator assembly may include a first cover. The isolator assembly may further include a second cover. The first cover and the second cover may combine to surround the body, the first lobe, and the second lobe.

The first cover may include a first set of extensions that at least partially covers the first lobe and the second lobe. The second cover may include a second set of extensions that at least partially covers the first lobe and the second lobe. The first lobe may include a first lobe opening. The second lobe may include a second lobe opening. The first set of extensions may include a first opening aligned with the first lobe opening. The first set of extensions may further include a second opening aligned with the second lobe opening. The second set of extensions may include a third opening aligned with the first lobe opening. The second set of extensions may further include a fourth opening aligned with the second lobe opening. The isolator assembly may further include a first aperture defined by the first set of extensions, the first lobe opening, and the second set of extensions. The first aperture may be configured to receive a first fastener and a first top hat bushing. The isolator assembly may further include a second aperture defined by the first set of extensions, the second lobe opening, and the second set of extensions. The second aperture may be configured to receive a second fastener and a second top hat bushing.

In accordance with one or more aspects of the disclosure, an isolator is described. The isolator may include a drive unit. The isolator may include a body. The body may include an opening. The body may further include several walls surrounding the opening. The walls may include one or more non-parallel portions. The isolator may further include a first lobe extending from the body. The first lobe may include a first lobe opening. The isolator may further include a second lobe extending from the body. The second lobe may include a second lobe opening. The walls may include a first wall and a second wall. The first wall and the second wall may define a void in the body.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology is directed to an isolator, or bushing, with modifications designed to increase the volume of material used to form the isolator. In one or more implementations, the isolator includes a body (e.g., bushing body) with lobes that extend from the body. The lobes may represent additional material used to further isolate one or structures from vibration (e.g., vibration from the drive unit). Further, each of the lobes may include an opening, or through hole, designed to receive a fastener and secure the isolator. Beneficially, the lobes can contribute to NVH performance while also providing an approach (e.g., the openings) for securing the bushing. The isolator may be part of an assembly that includes a pair of covers (e.g., clamshell covers) that enclose, or at least partially enclose, the isolator, including the body and the lobes. In one or more implementations, the covers function to constrain the body and the lobes of the isolator, while also having a shape that accommodates the lobes, thus allowing for additional isolator material.

Figure 1:
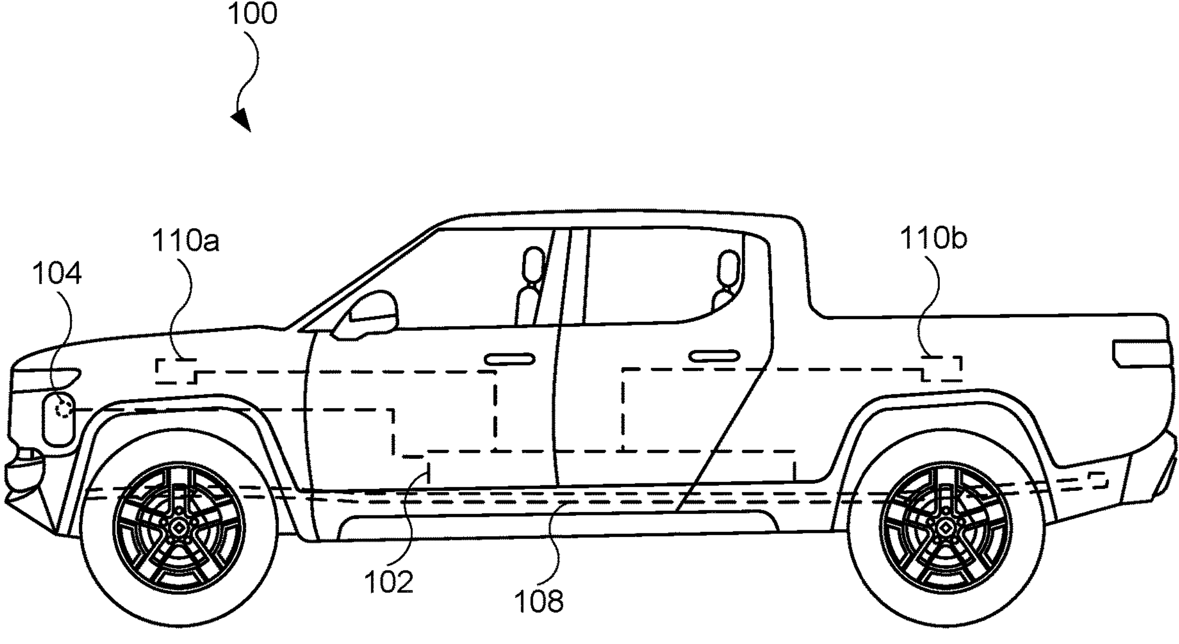
FIG. 1 illustrates an example of a vehicle, in accordance with aspects of the present disclosure.

FIG. 1 illustrates an example of a vehicle 100, in accordance with aspects of the present disclosure. In one or more implementations, the vehicle 100 is a sport utility vehicle (SUV). In the example shown in FIG. 1, the vehicle 100 is a truck. Generally, the vehicle 100 may take the form of any motorized vehicle, including motorized vehicles with an internal combustion engine and/or one or more electric motors. In this regard, other implementations of the vehicle 100 may include land-based vehicles, such as a car (e.g., sedan, hatchback), a van, or a commercial truck, as non-limiting examples.

The vehicle 100 may include a battery pack 102. The battery pack 102 may be coupled (e.g., electrically coupled) to one or more electrical systems of the vehicle 100 to provide power to the one or more electrical systems. The vehicle 100 may further include a port 104 (e.g., charge port) designed to receive a cable connector (not shown in FIG. 1) used to transmit power (e.g., AC power) that is converted to DC power to charge the battery pack 102. The vehicle 100 may include a chassis 108 used to support the battery pack 102 and various other components (not shown in FIG. 1) of the vehicle 100, such as a suspension, as non-limiting examples.

The battery pack 102 may couple to a drive unit 110*a* and a drive unit 110*b*, also referred to as a front drive unit and a rear drive unit, respectively. Each of the drive units 110*a* and 110*b* may include, for example, a motor, an inverter, a gear box, and a differential. In the example shown in FIG. 1, each of the drive units 110*a* and 110*b* takes the form of an electric motor. In this regard, each of the drive units 110*a* and 110*b* may use energy (e.g., electrical energy) stored in the battery pack 102 for propulsion in order to drive (e.g., rotationally drive) wheels of the vehicle 100.

Figure 2:
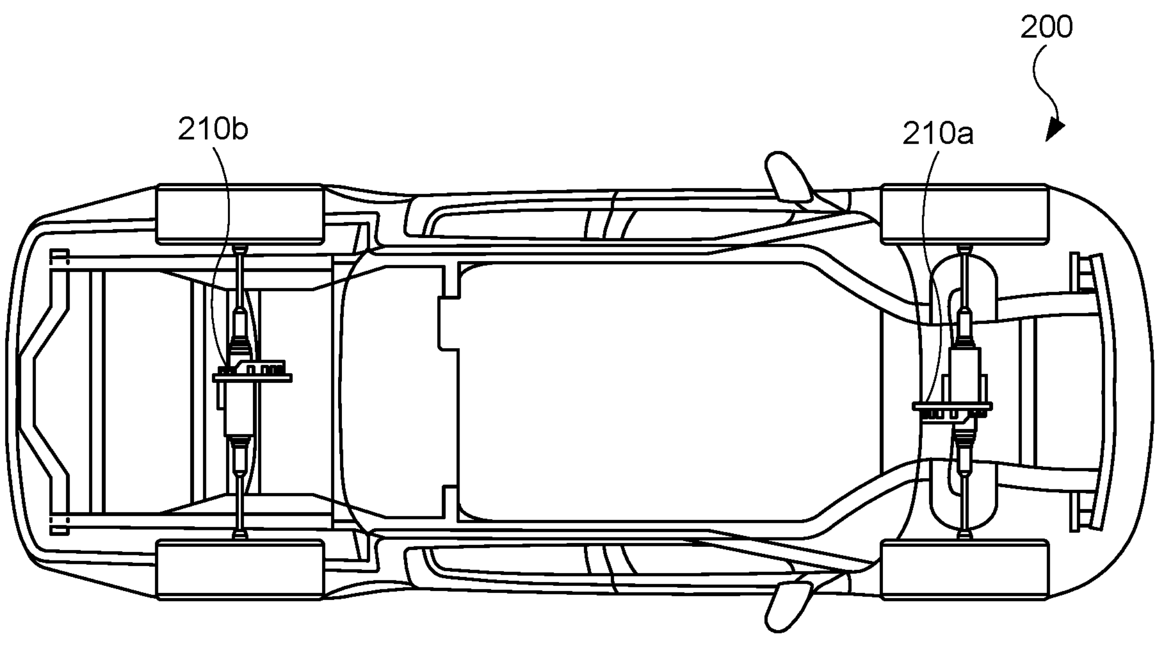
FIG. 2 illustrates an aerial view of a vehicle, showing an example of drive units of the vehicle, in accordance with aspects of the present disclosure.
Figure 3:
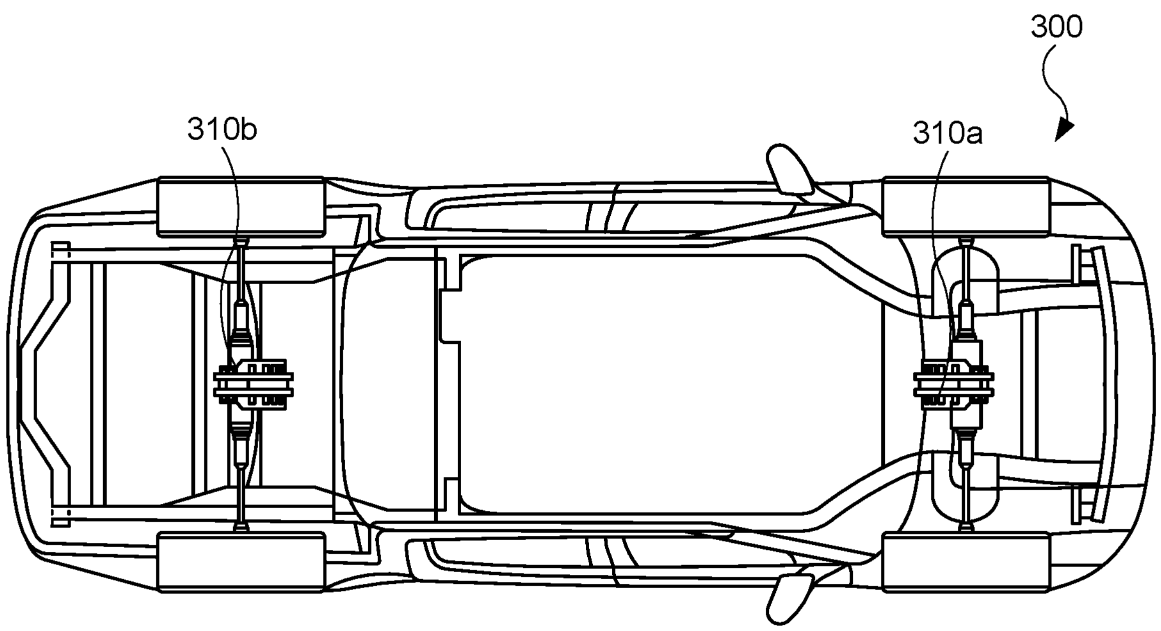
FIG. 3 illustrates an aerial view of a vehicle, showing an alternate example of drive units of the vehicle, in accordance with aspects of the present disclosure.

FIGS. 2 and 3 show vehicles with variations in their respective drive units. The vehicles shown and described in FIGS. 2 and 3 may include any features shown and described for the vehicle 100 (shown in FIG. 1).

FIG. 2 illustrates an aerial view of a vehicle 200, showing an example of drive units of the vehicle 200, in accordance with aspects of the present disclosure. As shown, the vehicle 200 includes a drive unit 210*a* and a drive unit 210*b*, also referred to as a front drive unit and a rear drive unit, respectively. Each of the drive units 210*a* and 210*b* may include a single motor, such as an electric motor. In this regard, the vehicle 200 may be referred to as a dual-motor vehicle.

FIG. 3 illustrates an aerial view of a vehicle 300, showing an alternate example of drive units of the vehicle 300, in accordance with aspects of the present disclosure. As shown, the vehicle 300 includes a drive unit 310*a* and a drive unit 310*b*, also referred to as a front drive unit and a rear drive unit, respectively. Each of the drive units 310*a* and 310*b* may include two motors, with each motor taking the form of an electric motor. In this regard, the vehicle 300 may be referred to as a quad-motor vehicle.

Figure 4:
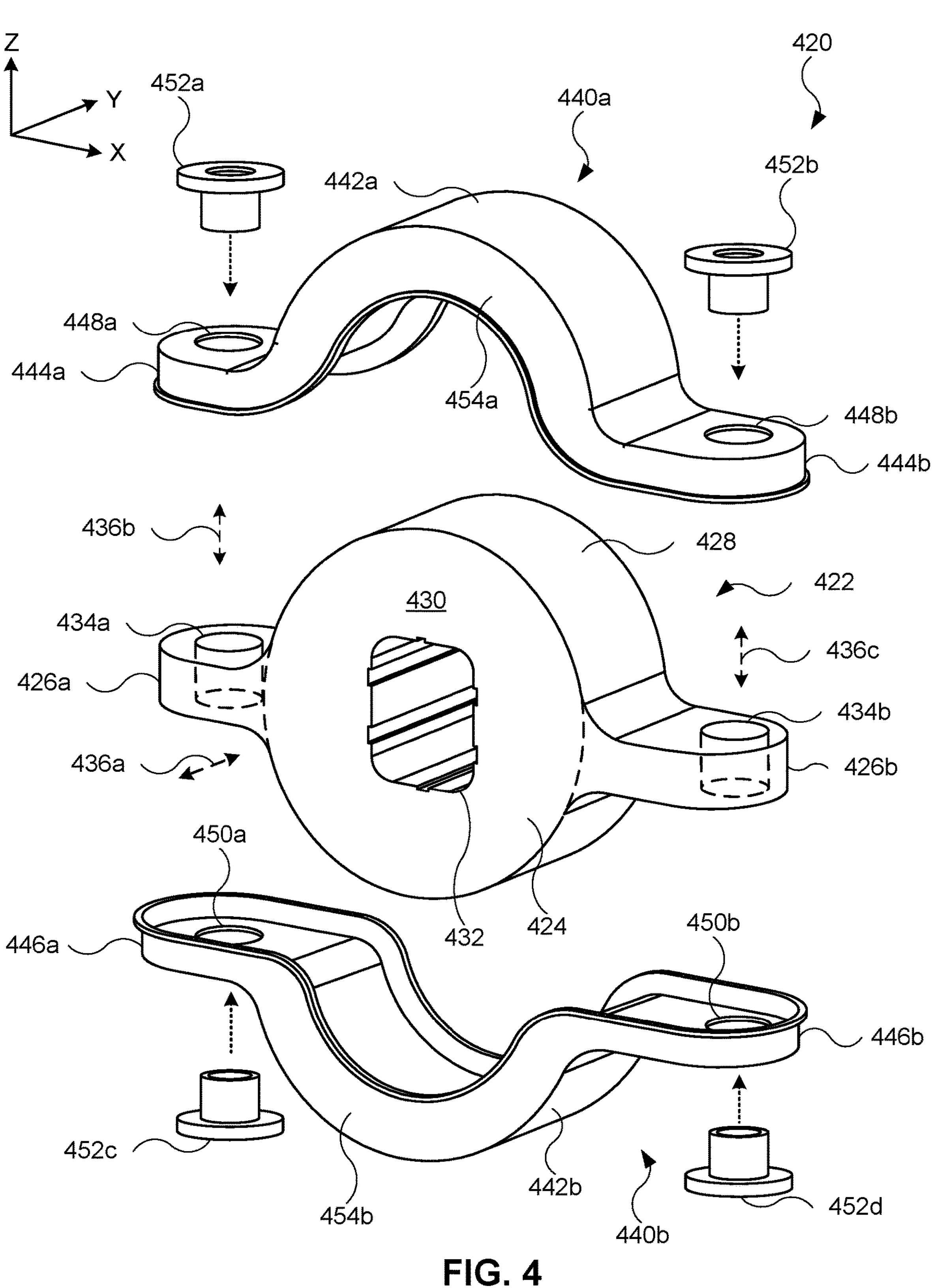
FIG. 4 illustrates an exploded view of an isolator assembly, in accordance with aspects of the present disclosure.

FIG. 4 illustrates an exploded view of an isolator assembly 420, in accordance with aspects of the present disclosure. The isolator assembly 420 (representative of one or more isolator assemblies shown and/or described herein) is designed to isolate one or more components (e.g., of the vehicles 100, 200, 300, shown in FIGS. 1, 2, and 3, respectively) from vibration caused by one or more drive units of a vehicle, as a non-limiting example.

The isolator assembly 420 may include an isolator 422, or bushing. The isolator 422 may include a body 424 (e.g., bushing body), a lobe 426*a*, and a lobe 426*b*. As shown, the body 424 includes a cylindrical, or substantially cylindrical, structure that is defined in part by a curved surface 428 and a planar surface 430, with the planar surface 430 forming a circular, or substantially circular, surface defined in part by dotted lines. The lobes 426*a* and 426*b*, or ears, may extend from the body 424 in opposite, or generally opposite, directions. However, the body 424 and the lobes 426*a* and 426*b* may be integrally formed together from a material (e.g., rubber, styrene butadiene rubber, ethylene propylene diene monomer rubber) or a compound that includes one or more of the aforementioned materials. The phrase "integrally formed" refers to two or more structures formed together by the same material(s) and by the same process. For example, the body 424 and the lobes 426*a* and 426*b* may be formed by a molding operation (e.g., injection molding) or by a three-dimensional printing operation, as non-limiting examples.

The isolator 422 may include several openings, or through holes. For example, the isolator 422 may include an opening 432 designed to receive a structure (not shown in FIG. 4), thus allowing the isolator 422 to couple to the structure at the opening 432. As shown, the opening 432 includes a generally rectangular opening with several grooves. However, this is exemplary and the opening 432 may include a different shape (e.g., circular) and may include fewer grooves (including no groove) or more grooves. Additionally, the lobe 426*a* and the lobe 426*b* may include an opening 434*a* and an opening 434*b*, respectively. The openings 434*a* and 434*b* are designed to receive one or more components. This will be discussed further below.

The opening 432 may include a three-dimensional space that extends in either direction of a two-sided arrow 436*a*. Additionally, each of the openings 434*a* and the opening 434*b* may include a three-dimensional space that extends in either direction of a two-sided arrow 436*b* and a two-sided arrow 436*c*, respectively, with each of the two-sided arrows 436*b* and 436*c* extending in a different direction as compared to that of the two-sided arrow 436*a*. For example, the two-sided arrow 436*a* may be perpendicular with respect to each of the two-sided arrows 436*b* and 436*c*. In this regard, the opening 432 may be oriented in one direction (e.g., in the direction of the two-sided arrow 436*a*) and each of the openings 434*a* and 434*b* may be oriented in a different direction (e.g., in the direction of the two-sided arrow 436*b* and the two-sided arrow 436*c*, respectively). Accordingly, the opening 432 may be oriented perpendicular with respect to each of the openings 434*a* and 434*b*.

In one or more implementations, the isolator 422 is subject to torque that causes displacement (e.g., deflection) of the isolator 422. Alternatively, or in combination, the isolator 422 is subject to vibration from a vehicle. However, in either case, the isolator 422 can provide a counterforce, thus minimizing forces applied to the structure within the opening 432, as well as other structures coupled to the structure. This will be shown below. Further, the lobes 426*a* and 426*b* provide material, in addition to the material of the body 424, to further counter the forces applied to the structure within the opening 432, thereby allowing the isolator 422 to further counter displacement and/or vibration. Beneficially, users of a vehicle that includes the isolator assembly 420 may experience less vibration during operation of the vehicle.

The isolator assembly 420 may further include a cover 440*a* and a cover 440*b*. Based on their respective shapes, each of the covers 440*a* and 440*b* may be referred to as a clamshell cover. The covers 440*a* and 440*b* are designed to enclose, or at least partially enclose, the isolator 422. In this regard, each of the covers 440*a* and 440*b* includes a shape that conforms, or at least partially conforms, to the shape of the isolator 422. For example, the cover 440*a* may include a curved wall 442*a* with a curvature that conforms, or at least partially conforms, to the curvature of the curved surface 428 (e.g., curved cylindrical surface) of the isolator 422. Further, the cover 440*a* may include an extension 444*a* and an extension 444*b* (defining a set of extensions), with the extensions 444*a* and 444*b* conforming, or at least partially conforming, to the shape of the lobe 426*a* and the lobe 426*b*, respectively. Similarly, the cover 440*b* may include a curved wall 442*b* with a curvature that conforms, or at least partially conforms, to the curvature of the curved surface 428 of the isolator 422. Further, the cover 440*b* may include an extension 446*a* and an extension 446*b* (defining a set of extensions), with the extensions 446*a* and 446*b* conforming, or at least partially conforming, to the shape of the lobe 426*a* and the lobe 426*b*, respectively.

The extensions 444*a*, 444*b*, 446*a*, and 446*b* may include openings designed to align with the openings of the lobes 426*a* and 426*b*. For example, the extension 444*a* and the extension 444*b* include an opening 448*a* and an opening 448*b*, respectively, and the extension 446*a* and the extension 446*b* include an opening 450*a* and an opening 450*b*, respectively. When the respective openings of the lobes 426*a* and 426*b*, the extensions 444*a* and 444*b*, and the extensions 446*a* and 446*b* align, one or more structures may pass through the openings. For example, a bushing 452*a*, a bushing 452*b*, a bushing 452*c*, and a bushing 452*d* may pass through respective openings, as indicated by arrows. Each of the bushings 452*a*, 452*b*, 452*c*, and 452*d* may be referred to as a top hat bushing, as a non-limiting example.

Based in part on the respective curved walls and extensions, the covers 440*a* and 440*b* may constrain the isolator 422, including the body 424 and the lobes 426*a* and 426*b* along one direction (e.g., a Z-axis in Cartesian coordinates). Additionally, each of the cover 440*a* and the cover 440*b* includes a sidewall 454*a* and a sidewall 454*b*, respectively. The sidewall 454*a* and 454*b* may constrain the isolator 422, including the body 424 and the lobes 426*a* and 426*b* along another direction (e.g., a Y-axis in Cartesian coordinates). Thus, the covers 440*a* and 440*b* may constrain the isolator 422 in at least two different degrees.

Figure 5:
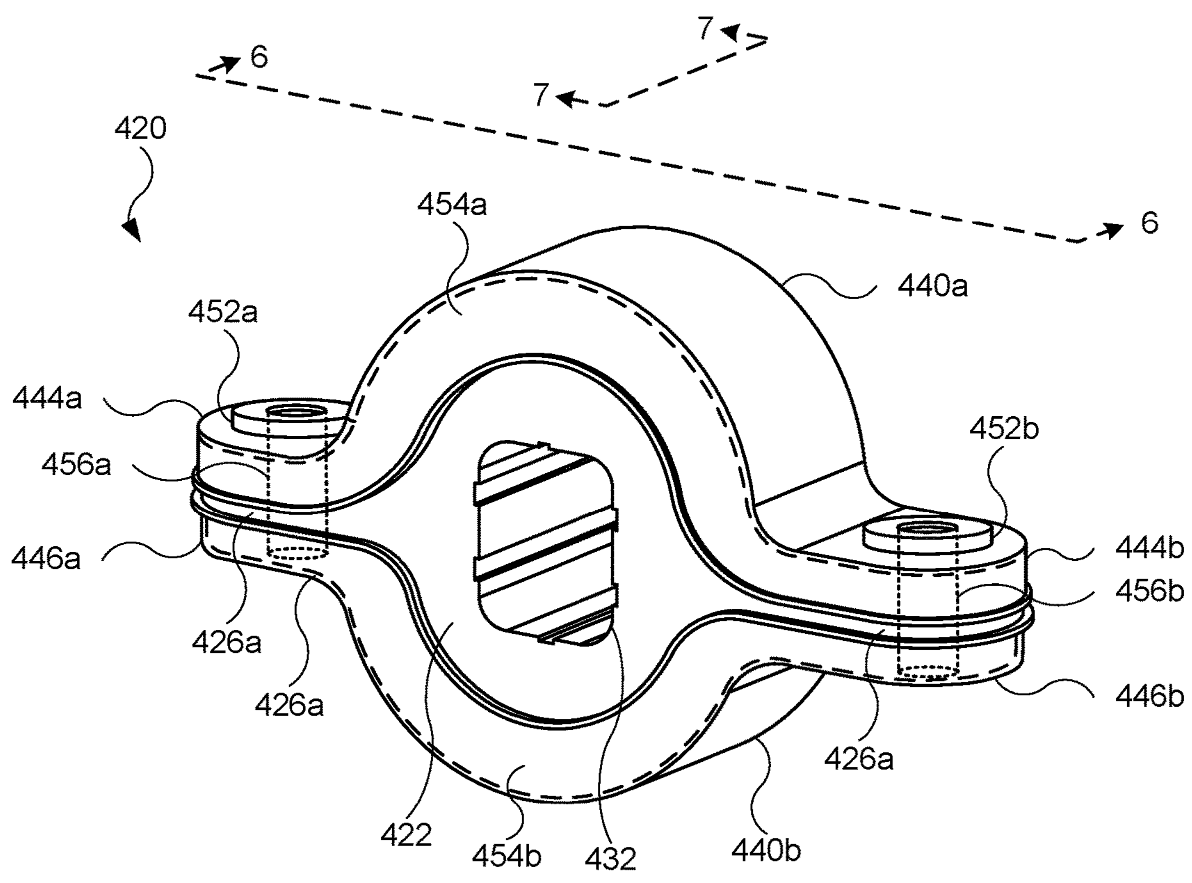
FIG. 5 illustrates a perspective view of an isolator assembly, in accordance with aspects of the present disclosure.

FIG. 5 illustrates a perspective view of the isolator assembly 420, showing several components of the isolator assembly 420 assembled together, in accordance with aspects of the present disclosure. The covers 440*a* and 440*b* may enclose the isolator 422, including the lobes 426*a* and 426*b* of the isolator 422, thus constraining the isolator 422. The sidewalls 454*a* and 454*b* may provide an additional constraint to the isolator 422, while not obstructing the opening 432 of the isolator 422.

Additionally, when the isolator assembly 420 is assembled, the respective openings (shown in FIG. 4) of the lobes 426*a* and 426*b*, the extensions 444*a* and 444*b*, and the extensions 446*a* and 446*b* are aligned. As shown, the respective openings may form an opening 456*a* and an opening 456*b* (each shown as dotted lines). For purposes of clarity, the opening 456*a* and the opening 456*b* may each be referred to as an aperture that is defined by a collection of openings. Further, the bushing 452*a* and the bushing 452*b* may be positioned in the opening 456*a* and the opening 456*b*, respectively. Although not shown in FIG. 5, the bushing 452*c* and the bushing 452*d* (both shown in FIG. 4) may be positioned in the opening 456*a* and the opening 456*b*, respectively. The bushings 452*a*, 452*b*, 452*c*, and 452*d* may take the form of hollow bushings, thus allowing a fastener (not shown in FIG. 5) to pass through the bushings 452*a* and the bushing 452*c*, as well as another fastener (not shown in FIG. 5) to pass through the bushings 452*b* and the bushing 452*d*. Due in part to the opening 456*a* and the opening 456*b* passing through the lobe 426*a* and the lobe 426*b*, respectively, the lobes 426*a* and 426*b* defined extended fastener points of the isolator 422.

Figure 6:
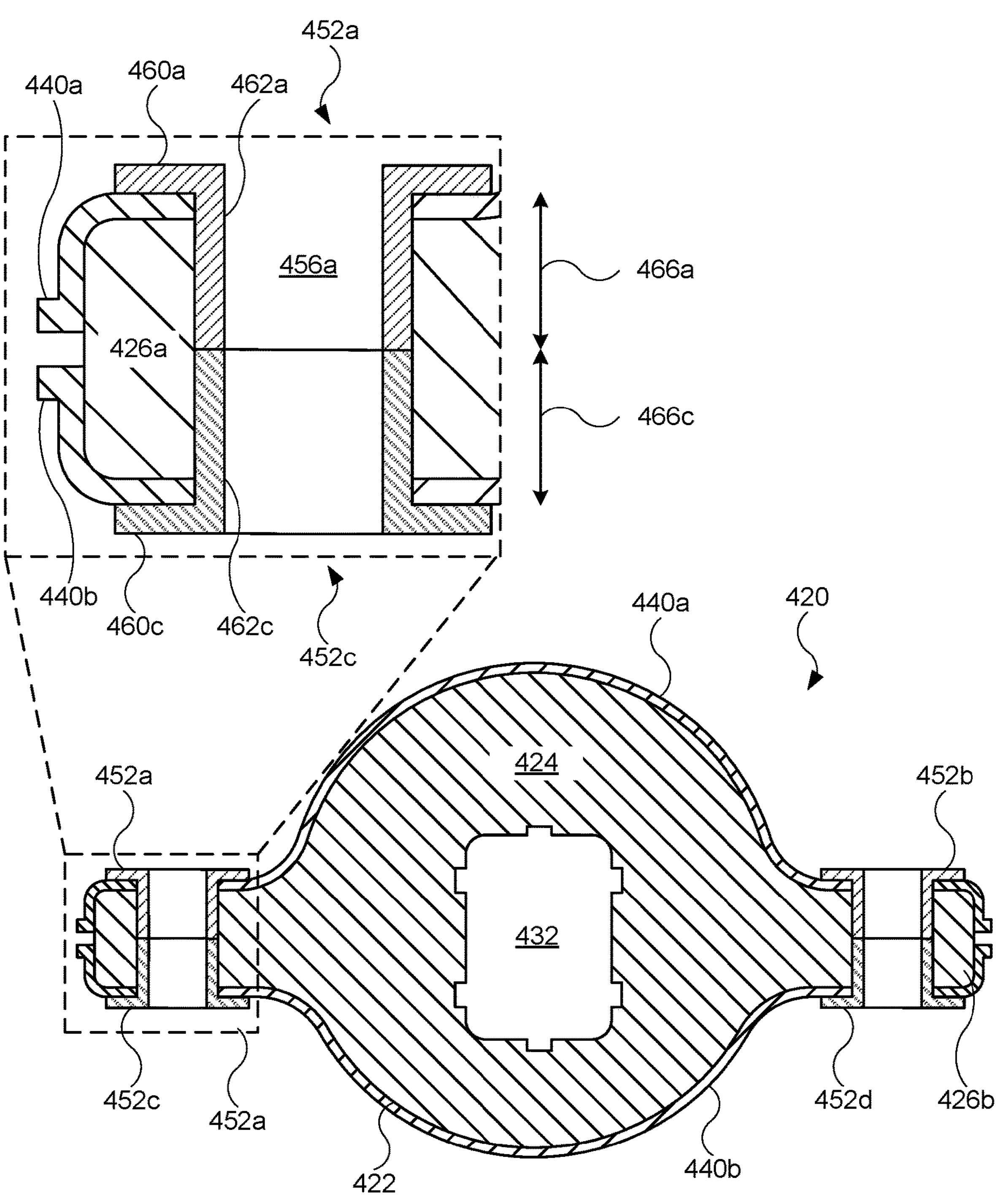
FIG. 6 illustrates a partial cross sectional view of the isolator assembly shown in FIG. 5, taken along line 6-6 in FIG. 5, in accordance with aspects of the present disclosure.

FIG. 6 illustrates a partial cross sectional view of the isolator assembly 420 shown in FIG. 5, taken along line 6-6 in FIG. 5, in accordance with aspects of the present disclosure. The bushings 452*a*, 452*b*, 452*c*, and 452*d* are inserted into the isolator assembly 420. As shown in the enlarged view, the bushing 452*a* includes a flange 460*a* and a shaft 462*a* that extends from the flange 460*a*. Similarly, the bushing 452*c* includes a flange 460*c* and a shaft 462*c* that extends from the flange 460*c*. The shafts 462*a* and 462*c* are positioned in the opening 456*a*.

The dimensions of the bushings 452 *a*, 452 *b*, 452 *c*, and 452 *d* may be based in part on the dimensions of the lobes 426 *a* and 426 *b*. For example, the shaft 462 *a* and the shaft 462 *c* may include a dimension 466 *a* and a dimension 466 *c*, respectively, with the dimensions 466 *a* and 466 *c* being equal, or approximately equal. The dimensions 466 *a* and 466 *c* are selected such that, when the bushings 452 *a* and 452 *c* are inserted into the opening 456 *a*, the shafts 462 *a* and 462 *c* may contact each other and provide at least some compression, by the flange 460 *a* and the flange 460 *c*, to the lobe 426 *a*. In this regard, the covers 440 *a* and 440 *b* may be separated by a gap to allow for the compression of the lobe 426 *a*. Put another way, the covers 440 *a* and 440 *b* may not contact each other. It will be appreciated that the lobe 426 *b* and the bushings 452 *b* and 452 *d* may include similar features and relationships as shown and/or described for the lobe 426 *a* and the bushings 452 *a* and 452 *c*, respectively.

When in use, the isolator assembly 420 is designed to counter one or more forces, e.g., torque. In this regard, the isolator assembly 420 may limit or prevent transmission of the forces to a structure (not shown in FIG. 6) connected to the opening 432 of the isolator 422. For example, the body 424 of the isolator 422 may undergo displacement while the one or more forces are applied, and provide a counterforce to the applied one or more forces, thus limiting the force applied to the object connected to the isolator 422 at the opening 432. Additionally, the lobes 426*a* and 426*b* may also undergo at least some displacement while the one or more forces are applied, and provide additional counterforces. Further, the covers 440*a* and 440*b* may constrain, or at least partially constrain, the body 424 and the lobes 426*a* and 426*b* while the one or more forces are applied.

Figure 7:
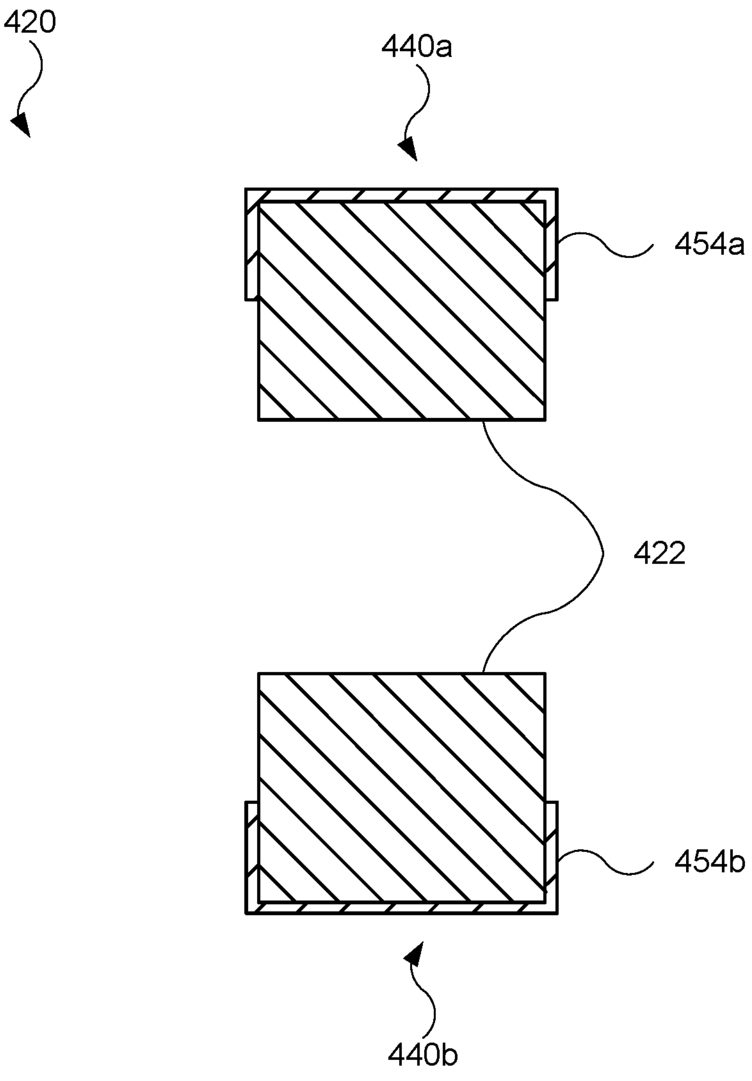
FIG. 7 illustrates a cross sectional view of the isolator assembly shown in FIG. 5, taken along line 7-7 in FIG. 5, in accordance with aspects of the present disclosure.

FIG. 7 illustrates a cross sectional view of the isolator assembly 420 shown in FIG. 5, taken along line 7-7 in FIG. 5, in accordance with aspects of the present disclosure. As shown, the covers 440*a* and 440*b* engage several surfaces of the isolator 422. For example, the sidewall 454*a* and the sidewall 454*b* of the cover 440*a* and the cover 440*b*, respectively, engage surfaces of the isolator 422 in order constrain the isolator. The sidewalls 454*a* and 454*b* may further engage surfaces of the lobes 426*a* and 426*b*, as shown in FIG. 6, thus constraining the lobes 426*a* and 426*b*.

FIGS. 6 and 7 show the covers 440*a* and 440*b* conforming, or at least partially conforming, to the shape of the isolator 422. Beneficially, by providing covers 440*a* and 440*b* that are conforming covers, the isolator assembly 420 may forego materials, such as adhesives, to secure the covers 440*a* and 440*b* to the isolator 422.

Figure 8:
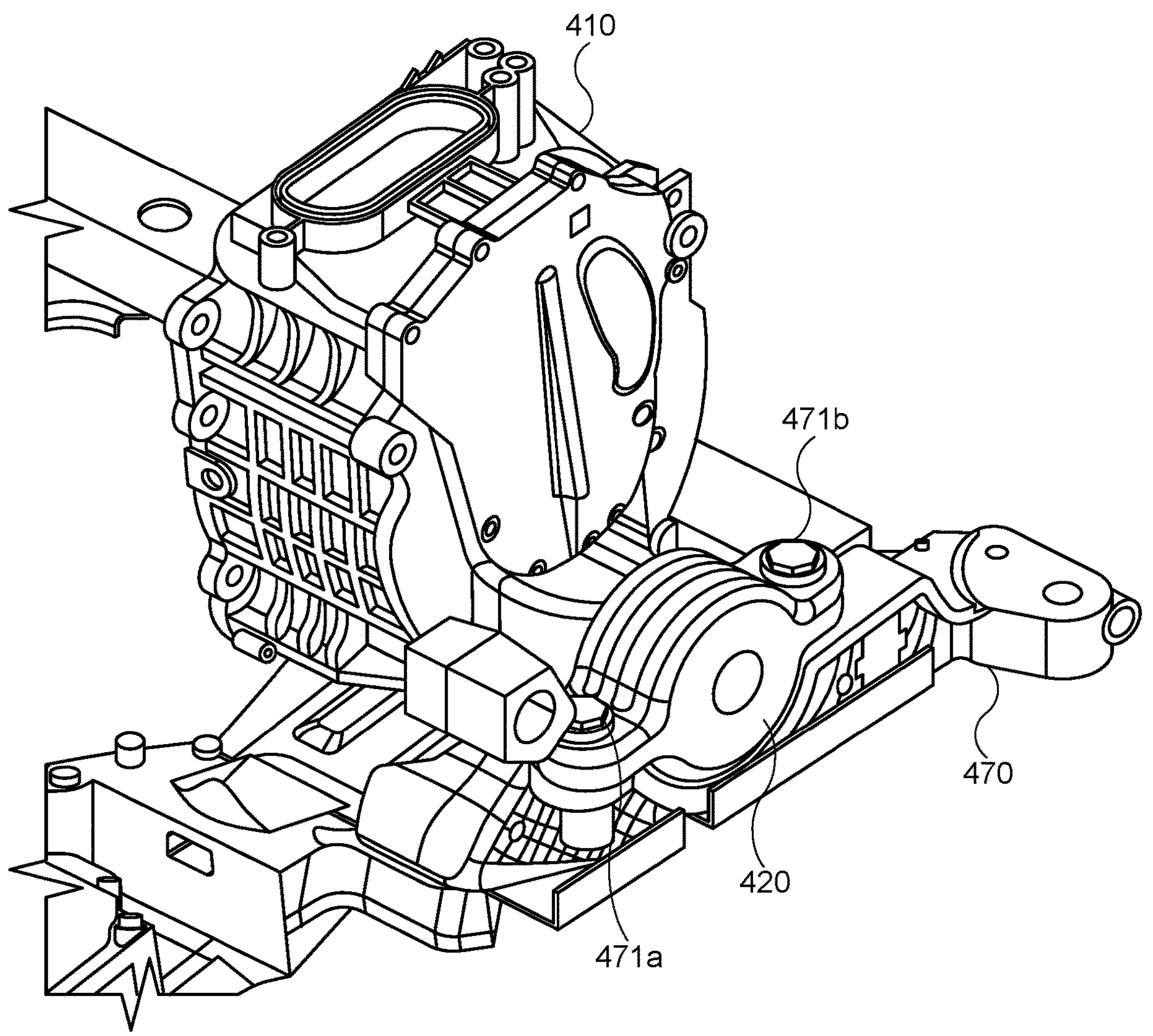
FIG. 8 illustrates a perspective view of a drive unit and an isolator assembly integrated with the drive unit, in accordance with aspects of the present disclosure.

FIG. 8 illustrates a perspective view of a drive unit 410 and the isolator assembly 420 integrated with the drive unit 410, in accordance with aspects of the present disclosure. The drive unit 410 may include one motor or two motors. The isolator assembly 420 may be coupled (e.g. bolted) to a subframe 470 by a fastener 471*a* and a fastener 471*b*. The drive unit 410 may also be coupled to the subframe 470 by, for example, bolting the drive unit 410 to the subframe 470. Thus, the subframe 470 may carry the drive unit 410 and the isolator assembly 420. While a single isolator assembly is shown for use with the drive unit 410, several additional isolator assemblies similar to the isolator assembly 420 may be used with the drive unit 410. Alternatively, isolator assembly 420 may be coupled to the drive unit 410.

Figure 9:
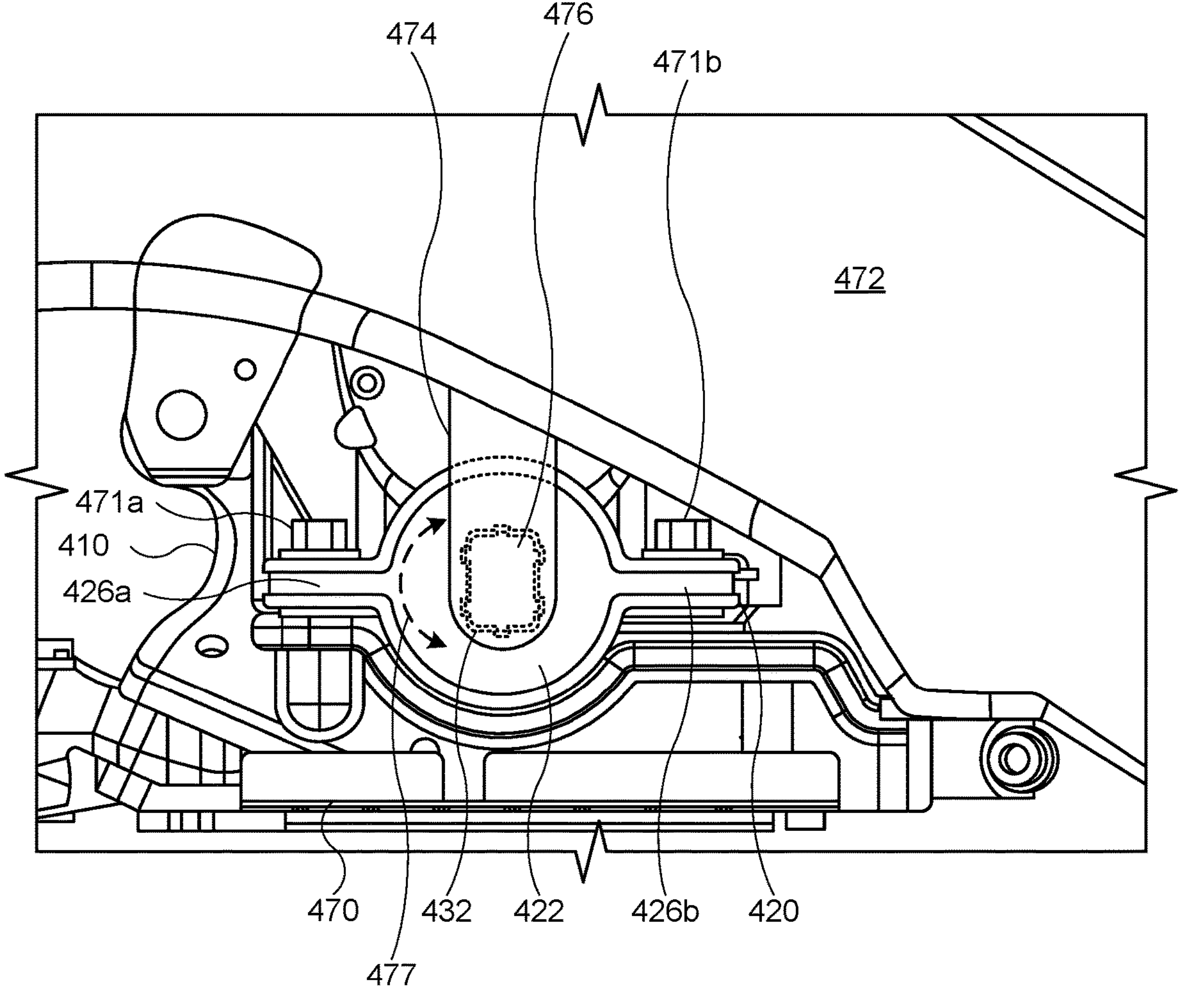
FIG. 9 illustrates a side view of a drive unit and an isolator assembly, in accordance with aspects of the present disclosure.

FIG. 9 illustrates a side view of the drive unit 410 and the isolator assembly 420, further showing the isolator assembly 420 coupled to a frame rail 472, in accordance with aspects of the present disclosure. As shown, the fastener 471*a* and the fastener 471*b* pass through the lobe 426*a* and the lobe 426*b*, respectively. The frame rail 472 may be part of a vehicle (e.g., vehicle 100 shown in FIG. 1). Accordingly, the drive unit 410, the isolator assembly 420, and the subframe 470 may be integrated with a vehicle. In order to couple the frame rail 472 with the drive unit 410, the frame rail 472 may include a bar 474 and a crossmember 476, with the crossmember 476 positioned in the opening 432 of the isolator 422.

During operation, the drive unit 410 may provide a torque, in either direction of a two-sided arrow 477. Due in part to the isolator assembly 420 functioning as an intermediary device between the drive unit 410 and the frame rail 472, the torque provided by the drive unit 410 may applied to the isolator assembly 420. However, the isolator assembly 420, and in particular the isolator 422, may be displaced, while also providing a counterforce to counter, or at least partially counter, the torque applied by the drive unit 410. Additionally, the lobes 426*a* and 426*b* provide additional material to the isolator 422 that may be used to counter the applied torque, thus minimizing or prevent torque applied to the frame rail 472. Beneficially, the torque and associated effects (e.g., unwanted movement of the frame rail 472) of the torque are minimized or eliminated by the isolator assembly 420.

Figure 10:
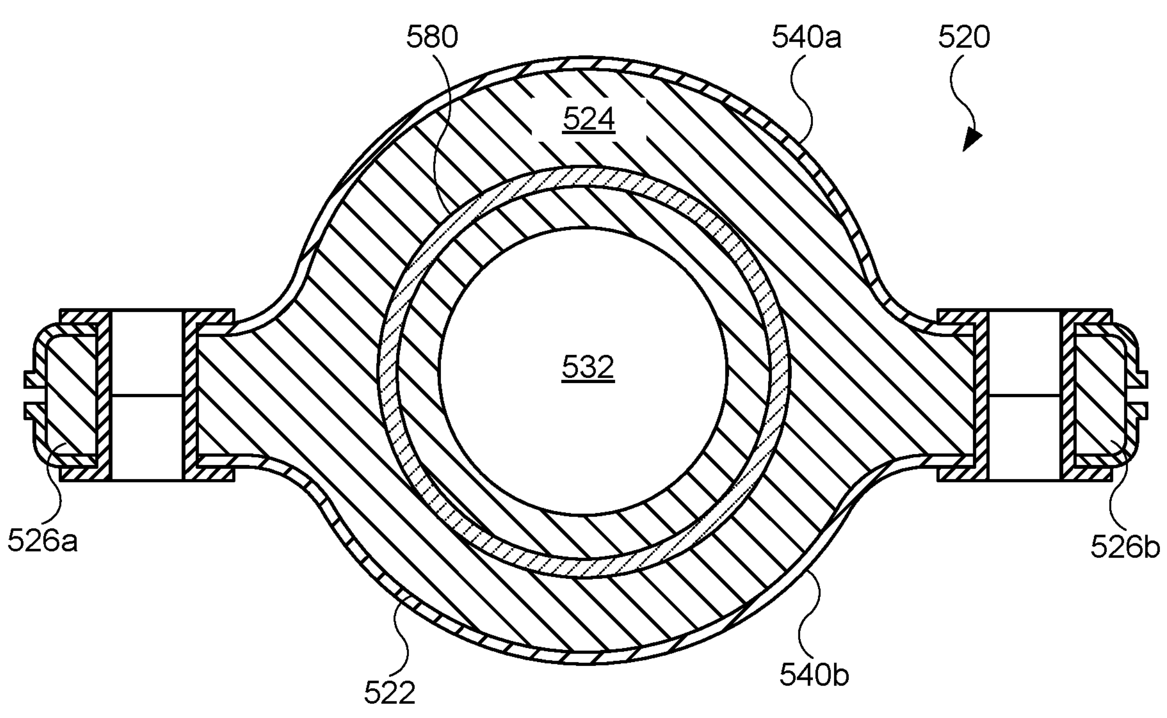
FIG. 10 illustrates a partial cross sectional view of an alternate example of an isolator assembly, in accordance with aspects of the present disclosure.
Figure 11:
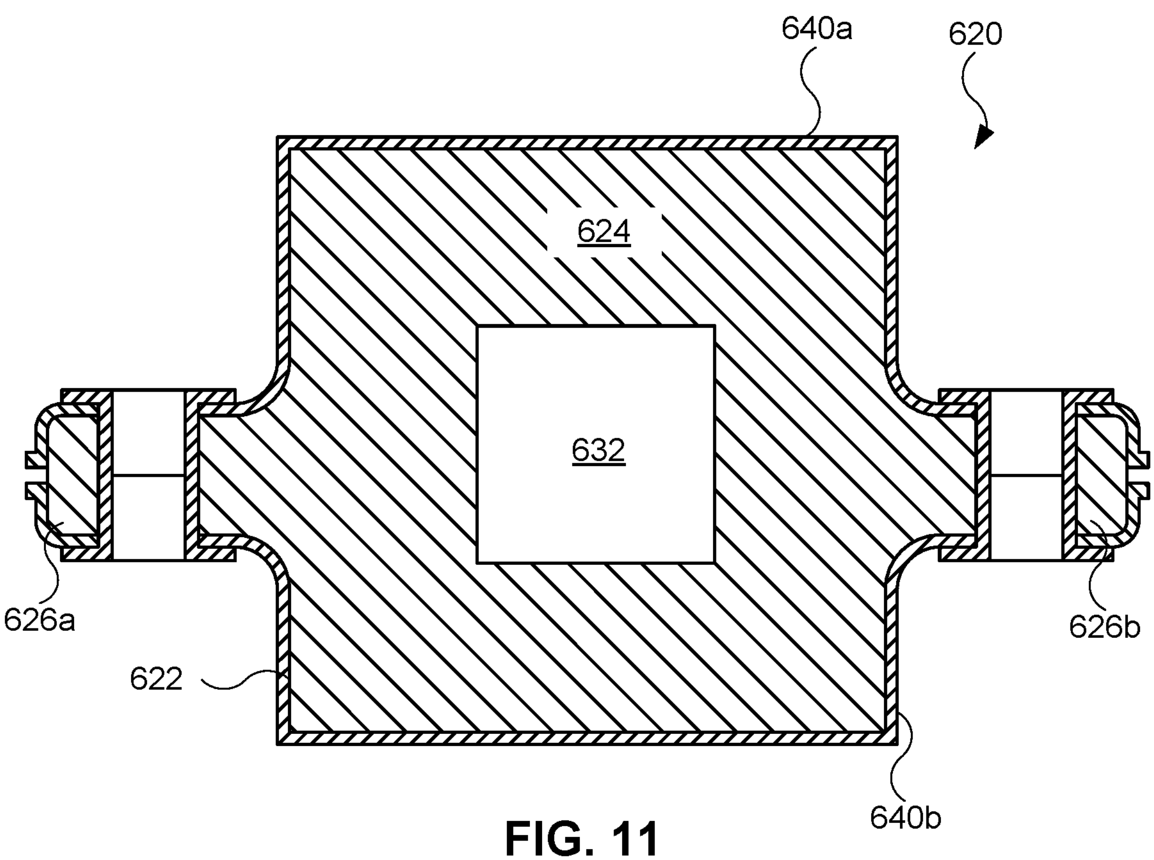
FIG. 11 illustrates a partial cross sectional view of yet another example of an isolator assembly, in accordance with aspects of the present disclosure.

FIGS. 10 and 11 show and describe alternate examples of an isolator assembly. While not expressly stated, the isolator assemblies shown and described in FIGS. 10 and 11 may include several, if not all, features shown and described for the isolator assembly 420 shown in FIGS. 4-9. Additionally, at least some features shown and/or described in FIGS. 10 and 11 may be used to modify the isolator assembly 420 shown in FIGS. 4-9.

FIG. 10 illustrates a partial cross sectional view of an alternate example of an isolator assembly 520, in accordance with aspects of the present disclosure. The isolator assembly 520 may include an isolator 522 with a body 524, a lobe 526*a*, and a lobe 526*b*. The isolator 522 may include an opening 532 that takes the form of a circular opening, as a non-limiting example. The isolator assembly 520 may further include a cover 540*a* and a cover 540*b* that encloses, or at least partially encloses, the isolator 522. The isolator assembly 520 may further include a ring 580 integrated with the isolator 522. In one or more implementations, the ring 580 includes a metal ring, such as steel (as a non-limiting example). As shown, the ring 580 encircles the opening 532. The ring 580 is designed to provide the isolator 522 with additional support to counter an applied torque.

FIG. 11 illustrates a partial cross sectional view of yet another example of an isolator assembly 620, in accordance with aspects of the present disclosure. The isolator assembly 620 may include an isolator 622 with a body 624, a lobe 626*a*, and a lobe 626*b*. The body 624 may include a rectangular body (e.g., square body). The isolator 622 may include an opening 632 that takes the form of a rectangular opening (e.g., square opening). The isolator assembly 620 may further include a cover 640*a* and a cover 640*b* that encloses, or at least partially encloses, the isolator 622. As shown, the covers 640*a* and 640*b* may conform to the shape of the body 624 and the lobes 626*a* and 626*b*.

Figure 12:
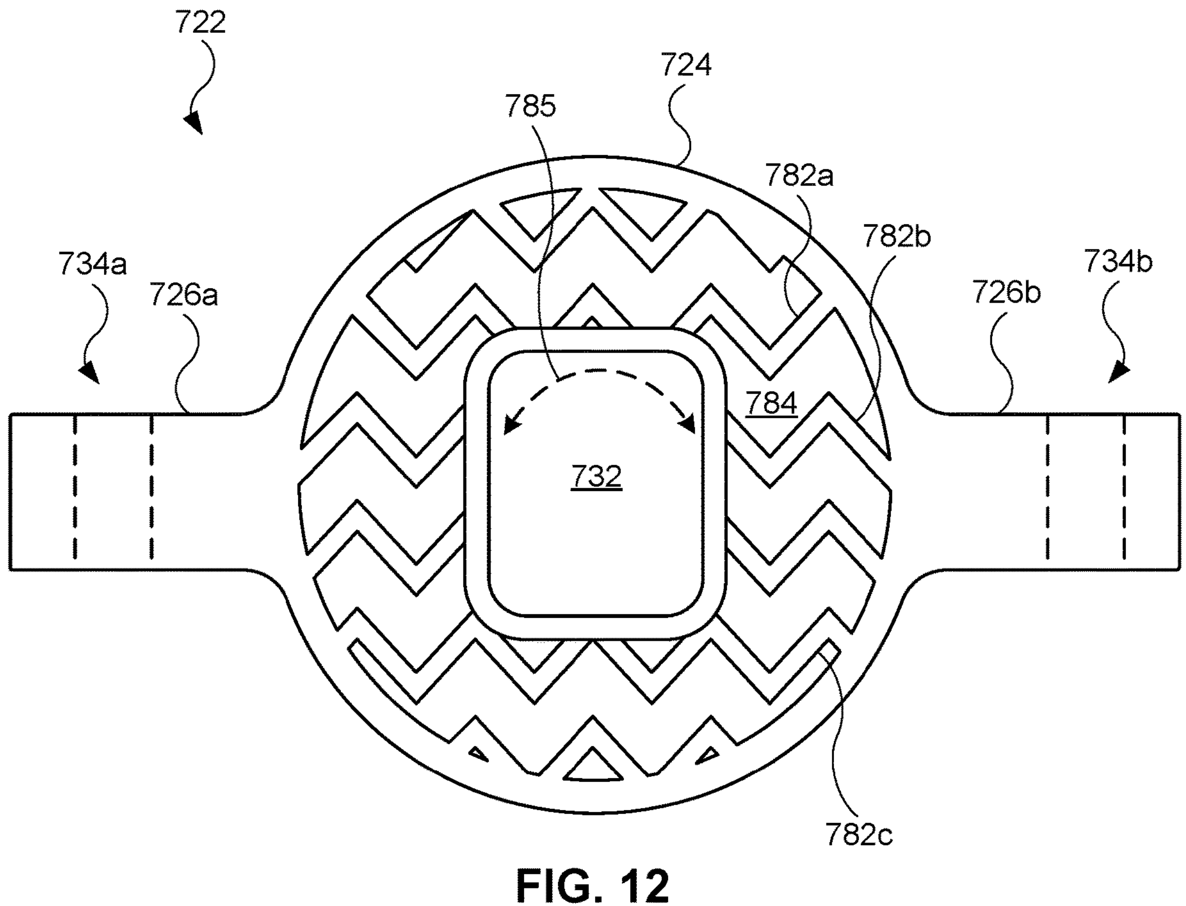
FIG. 12 illustrates a side view of an alternate example of a bushing, in accordance with aspects of the present disclosure.

FIG. 12 illustrates a side view of an example of an isolator 722, in accordance with aspects of the present disclosure. The isolator 722 may include a body 724, a lobe 726*a*, and a lobe 726*b*. The isolator 722 may include an opening 732 that takes the form of a rectangular opening, as a non-limiting example. Although not shown, the isolator 722 may be part of an isolator assembly that includes one or more covers designed to enclose, or at least partially enclose, the isolator 722, similar to prior examples. Also, each of the lobes 726*a* and 726*b* may include an opening 734*a* and an opening 734*b*, respective, with each of the openings 734*a* and 734*b* designed to receive one or more top hat bushings as well as a fastener (not shown in FIG. 12)

The body 724 may include several walls with voids, or spaces, between the walls. For example, the body 724 may include a wall 782*a*, a wall 782*b*, and a wall 782*c*, representative of additional walls in the body 724. The walls 782*a*, 782*b*, and 782*c* may be characterized has having several non-parallel portions, or diagonal portions. Also, the walls 782*a*, 782*b*, and 782*c*, may combine to surround the opening 732. In this regard, the opening 732 may be referred to as a central opening.

Further, a void 784, representative of several additional voids, may be formed in the body 724. As shown, the void 784 is positioned between the walls 782*a* and 782*b*, and accordingly, may be defined in part by the walls 782*a* and 782*b*. The void 784 may include an opening or space that does not include any material (e.g., materials used to form the isolator 722).

A force (e.g., torque, shear force) applied to the isolator 722 in either direction of a two-sided arrow 785 may cause movement of the wall 782*a* and/or the wall 782*b*. However, based on the void 784, each of the walls 782*a* and 782*b* can generally move freely within the body 724. Beneficially, the isolator 722 may undergo additional displacement based on the movement of the walls 782*a* and 782*b*, and the void 784 between the walls 782*a* and 782*b*. Further, the amount of force the isolator 722 can undergo may be defined in part by the thickness of each of the walls 782*a* and 782*b*. In this regard, the dimensions of the walls 782*a* and 782*b* may be adjusted and effectively tuned to counter a predetermined amount of force. By using formation methods such as three-dimensional printing (as a non-limiting example), the isolator 722 may be manufactured to counter a predetermined amount of force.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. An isolator assembly, comprising:

an isolator, comprising:

a body that defines a curved surface and a planar surface;

a first lobe extending from the body and comprising a first lobe opening; and a second lobe extending from the body and comprising a second lobe opening; and a first cover comprising first set of extensions that at least partially cover the first lobe, the second lobe, the curved surface, and the planar surface, the first set of extensions comprising:

a first opening aligned with the first lobe opening, and a second opening aligned with the second lobe opening; and a second cover comprising a second set of extensions that at least partially cover the first lobe, the second lobe, the curved surface, and the planar surface, the second set of extensions comprising:

a third opening aligned with the first lobe opening, and a fourth opening aligned with the second lobe opening; and a first bushing disposed in the first opening, the first bushing comprising a first shaft and a first flange; and a second bushing disposed in the first lobe opening, the second bushing comprising a second shaft and a second flange, wherein the first shaft contacts the second shaft, and the first flange and the second flange are configured to compress the first lobe.

2. The isolator assembly of claim 1, wherein the second set of extensions covers a planar surface of the first lobe and a planar surface of the second lobe.

3. The isolator assembly of claim 1, wherein:

the first cover comprises a first curved wall that conforms to the curved surface.

4. The isolator assembly of claim 1, wherein:

the first cover comprises a first sidewall, the second cover comprises a second sidewall, and based in part on the first sidewall and the second sidewall, the first cover and the second cover are configured to constrain the isolator in two degrees of freedom.

* * * * *